US009231395B2

(12) United States Patent
Maier et al.

(10) Patent No.: US 9,231,395 B2
(45) Date of Patent: Jan. 5, 2016

(54) SUBSEA HIGH VOLTAGE TERMINAL ASSEMBLY

(71) Applicant: Dresser-Rand Company, Olean, NY (US)

(72) Inventors: William C. Maier, Almond, NY (US); Jose L. Gilarranz, Katy, TX (US); John Battershell, Hamburg, NY (US); Timothy Griffin, Allegany, NY (US); Matthew Pilon, Smethport, PA (US); Pascal Lardy, Houston, TX (US); Elroy Brickey, Cuba, NY (US); Joel Johnson, Bradford, PA (US); Anthony James, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 22 days.

(21) Appl. No.: 14/252,866

(22) Filed: Apr. 15, 2014

(65) Prior Publication Data

US 2014/0315425 A1 Oct. 23, 2014

Related U.S. Application Data

(60) Provisional application No. 61/813,750, filed on Apr. 19, 2013.

(51) Int. Cl.
*H01R 13/60* (2006.01)
*H02G 9/02* (2006.01)
*F04D 25/06* (2006.01)
*H01R 13/523* (2006.01)

(52) U.S. Cl.
CPC .............. *H02G 9/02* (2013.01); *F04D 25/0686* (2013.01); *F04D 25/0693* (2013.01); *H01R 13/523* (2013.01); *Y10T 29/49208* (2015.01)

(58) Field of Classification Search
CPC ............ F04D 25/0686; F04D 25/0693; H01R 13/523; H02G 9/02; Y10T 29/49208
USPC .............. 439/604, 337, 685; 310/71; 277/322
See application file for complete search history.

(56) References Cited

U.S. PATENT DOCUMENTS

| | | | | |
|---|---|---|---|---|
| 6,315,528 B1* | 11/2001 | Williams | ............... | F04C 23/008 340/649 |
| 6,699,078 B2* | 3/2004 | Quadir | ................... | H01R 13/53 439/272 |
| 6,779,989 B2* | 8/2004 | Makino | ................... | F04B 35/04 417/410.1 |
| 6,910,904 B2* | 6/2005 | Herrick | ................. | F04B 39/121 439/271 |
| 2009/0060749 A1* | 3/2009 | Hoying | ................. | F04B 39/121 417/1 |
| 2012/0322305 A1* | 12/2012 | Uchiyama | .......... | H01R 13/5208 439/587 |
| 2014/0368069 A1* | 12/2014 | Ren | ...................... | H01R 13/622 310/71 |
| 2015/0061432 A1* | 3/2015 | Gilarranz | ................. | H02K 3/50 310/71 |

* cited by examiner

*Primary Examiner* — Abdullah Riyami
*Assistant Examiner* — Nader J Alhawamdeh
(74) *Attorney, Agent, or Firm* — Edmonds & Nolte, PC

(57) ABSTRACT

A system and method are provided for a terminal assembly of a subsea motor-compressor. The terminal assembly may include a plurality of terminal ports extending through a hollow spherical body to a cavity defined therein. The terminal assembly may also include a penetrator detachably coupled with the spherical body about each of the plurality of terminal ports. The terminal assembly may further include a mounting port extending through the spherical body to the cavity defined therein. The mounting port may be configured to couple the terminal assembly with a housing of the motor-compressor.

17 Claims, 4 Drawing Sheets

SUBSEA HIGH VOLTAGE TERMINAL ASSEMBLY

CROSS REFERENCE TO RELATED APPLICATIONS

This application claims priority to U.S. Provisional Patent Application having Ser. No. 61/813,750, which was filed Apr. 19, 2013. This priority application is hereby incorporated by reference in its entirety into the present application to the extent consistent with the present application.

BACKGROUND

Reliable and efficient compression systems have been developed and are used in a myriad of industrial processes (e.g., petroleum refineries, offshore oil production platforms, and subsea process control systems). There is, however, an ever-increasing demand for smaller, lighter, and more compact compression systems. Accordingly, compact motor-compressors that incorporate compressors directly coupled to high-speed electric motors have been developed. Conventional compact motor-compressors may combine a high-speed electric motor with a compressor, such as a centrifugal compressor, in a single, hermetically sealed housing. In compact motor-compressors, the high-speed electric motor may operate in a process fluid contained in the housing, which may be maintained at a pressure from about 1 megapascal (MPa) to about 30 MPa. To deliver an electrical current across the pressure boundary of the housing and power the high-speed electric motor, high voltage penetrators (HVPs) are often utilized. In topside or terrestrial (e.g., ground based) environments with ambient air external conditions, the HVPs may be contained in a pipe section extending from the sealed housing. These pipe sections, however, are neither practical nor adequate for the larger and more complex HVPs required in subsea environments.

In view of the foregoing, compact motor-compressors used in subsea environments may often include a terminal assembly in lieu of the pipe section to engage or couple with the HVPs. FIG. 1 illustrates a partial, cross-sectional view of a conventional compact motor-compressor 100 including a conventional terminal assembly 102. The motor-compressor 100 may combine a pressurized, high-speed motor 120 with a compressor 130 in a hermetically sealed housing 112. The motor-compressor 100 may further include a terminal assembly 102 disposed about the housing 112 and configured to couple with one or more HVPs 106, 108, 110. The HVPs 106, 108, 110 may be configured to receive an electrical current from a sea- or land-based power source and deliver the electrical current to the motor 120 via the terminal assembly 102. To limit power losses resulting from induced eddy currents, the terminal assembly 102 may be cast with costly non-magnetic metals. However, in conventional motor-compressors 100, the terminal assembly 102 may often be cast integral with the housing 112, thereby hindering the ability to fabricate the terminal assembly 102 and the housing 112 from different materials. As such, the housing 112 and the terminal assembly 102 are often cast with the same cost effective metallic materials and the resulting power losses from induced eddy currents are accepted. Further, in conventional motor-compressors 100, the HVPs 106, 108, 110 are often coupled with the terminal assembly 102 in a co-linear orientation, which results in an increased distance and an increased amount of metallic material interposed between each of the HVPs 106, 108, 110. The increased amount of metallic material may also contribute to the overall power losses from induced eddy currents.

What is needed, then, is an improved, cost-effective motor-compressor system and method of operating thereof, including a terminal assembly capable of minimizing induced power losses.

SUMMARY

Embodiments of the disclosure may provide a terminal assembly for a subsea motor-compressor. The terminal assembly may include a plurality of terminal ports extending through a hollow spherical body to a cavity defined therein. The terminal assembly may also include a penetrator detachably coupled with the spherical body about each of the plurality of terminal ports. The terminal assembly may further include a mounting port extending through the spherical body to the cavity defined therein. The mounting port may be configured to couple the terminal assembly with a housing of the motor-compressor.

Embodiments of the disclosure may further provide another terminal assembly for a subsea motor-compressor. The terminal assembly may include a plurality of terminal ports extending through a hollow body to a cavity defined therein. The plurality of terminal ports may be helically arranged about a longitudinal axis of the hollow body. A penetrator may be detachably coupled with the hollow body about each of the plurality of terminal ports. The terminal assembly may also include a mounting port extending through the hollow body to the cavity defined therein. The mounting port may be configured to couple the terminal assembly with a housing of the motor-compressor.

Embodiments of the disclosure may further provide a method for operating a subsea motor-compressor. The method may include coupling a terminal assembly to a housing of the motor-compressor. The terminal assembly may include a plurality of terminal ports extending through a hollow spherical body to a cavity defined therein. The terminal assembly may also include a penetrator detachably coupled with the hollow spherical body about each of the plurality of terminal ports. The terminal assembly may further include a mounting port extending through the hollow spherical body to the cavity defined therein. The mounting port may be configured to couple the terminal assembly with the housing of the motor-compressor. The method may also include receiving an electrical current from a power source via the penetrator of the terminal assembly. The method may further include delivering the electrical current from the terminal assembly to a motor of the motor-compressor.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
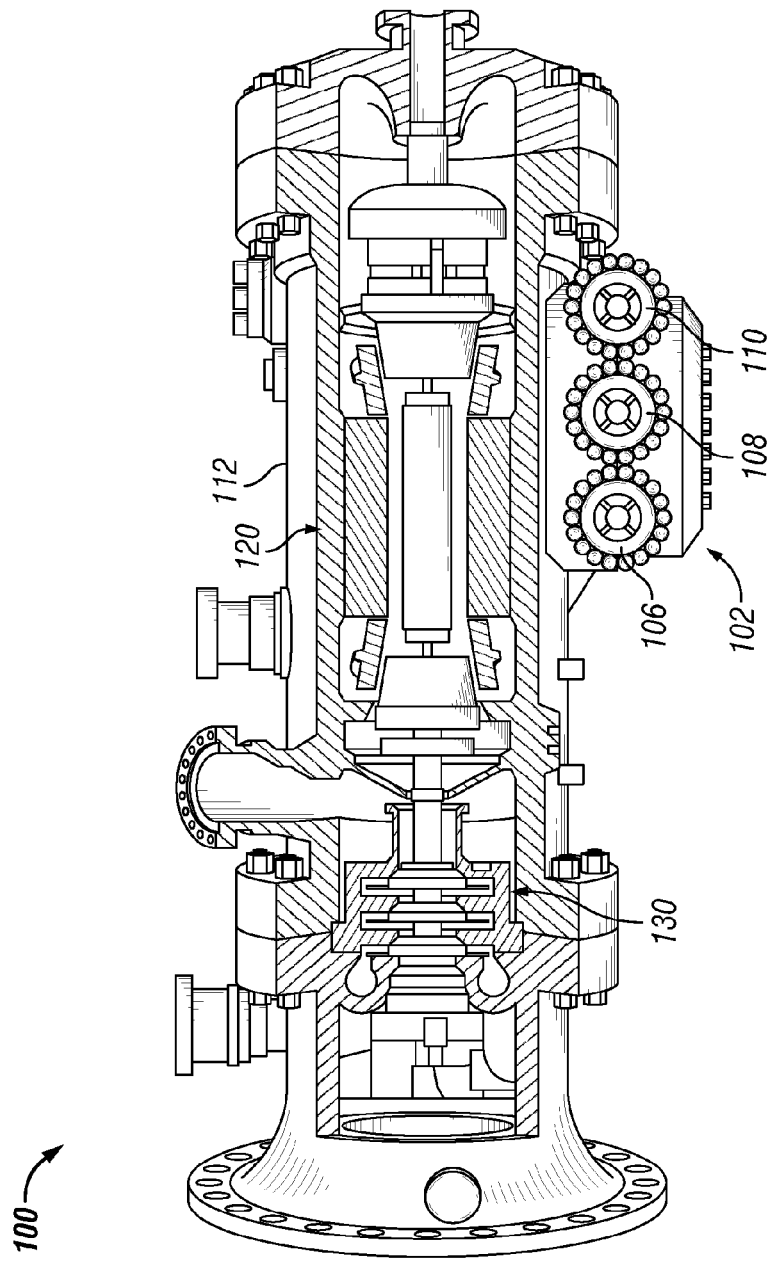
FIG. 1 illustrates a partial, cross-sectional view of a conventional compact motor-compressor including a conventional terminal assembly, according to the prior art.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

As described herein, the expression spherical or substantially spherical shall be understood in a broader sense to include rotationally rounded shapes such as egg-shapes, ovoid shapes, ellipses, spheroids, substantially true spheres and true spheres. The rotationally rounded shapes may be symmetrical or asymmetrical. For example, a radius of curvature of a first portion of the rounded shape may be the same or different than a radius of curvature of a second portion of the rounded shape.

Figure 2A:
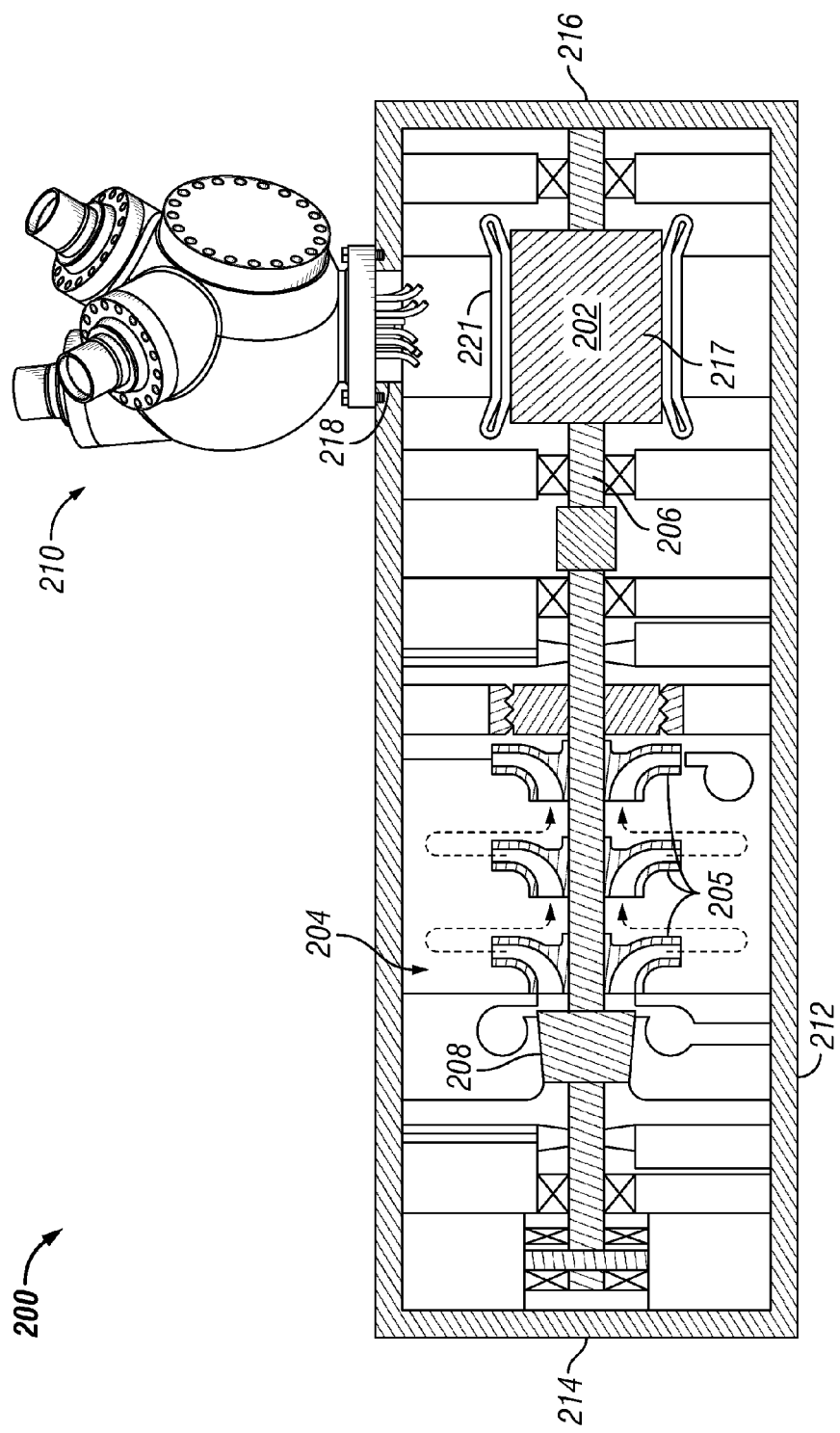
FIG. 2A illustrates a partial, cross-sectional view of an exemplary compact motor-compressor including an exemplary terminal assembly coupled thereto, according to one or more embodiments disclosed.

FIG. 2A illustrates a partial, cross-sectional view of an exemplary compact motor-compressor 200 including an exemplary terminal assembly 210 coupled thereto, according to one or more embodiments. The motor-compressor 200 may include a housing 212 having a compressor end 214 and a motor end 216. The housing 212 may contain and hermetically seal a motor 202, a compressor 204, an integrated separator 208, or any combination thereof. The motor 202 may be disposed near the motor end 216 of the housing 212 and the compressor 204 may be disposed near the compressor end 214 of the housing 212. The motor 202 may be coupled with the compressor 204 via a rotary shaft 206 extending substantially from the motor end 216 to the compressor end 214.

The motor 202 may be an electric motor, such as a permanent magnet motor, and may include a stator 221 and a rotor 217. It may be appreciated, however, that other embodiments may employ other types of electric motors including, but not limited to, synchronous motors, induction motors, brushed DC motors, or the like. The compressor 204 may be a multi-stage centrifugal compressor with one or more compressor stage impellers 205. It may be appreciated, however, that any number of impellers 205 may be implemented or used without departing from the scope of the disclosure.

In at least one embodiment, the motor-compressor 200 may include the integrated separator 208 coupled with the motor 202 via the rotary shaft 206. In another embodiment, the integrated separator 208 may be omitted from the motor-compressor 200. The integrated separator 208 may be configured to separate and remove higher-density components from lower-density components contained within a process gas introduced thereto. The higher-density components (i.e., liquids and/or solids) removed from the process gas may be discharged from the integrated separator 208 via a discharge line (not shown), thereby providing a relatively dry process gas to be introduced into the compressor 204. Especially in subsea applications where the process gas may commonly be multiphase, any separated liquids discharged via the discharge line may accumulate in a collection vessel (not shown) and be subsequently pumped back into the process gas at a pipeline (not shown) located downstream of the compressor 204. Otherwise, separated liquids may alternatively be drained into the collection vessel for subsequent disposal.

An aperture 218 may be defined in the housing 212 to provide communication or access to the motor 202 disposed therein. The terminal assembly 210 may be coupled to the housing 212 about the aperture 218 to provide electrical current or power from a power source (not shown) outside the housing 212 to the motor 202, as further discussed below.

Figure 2C:
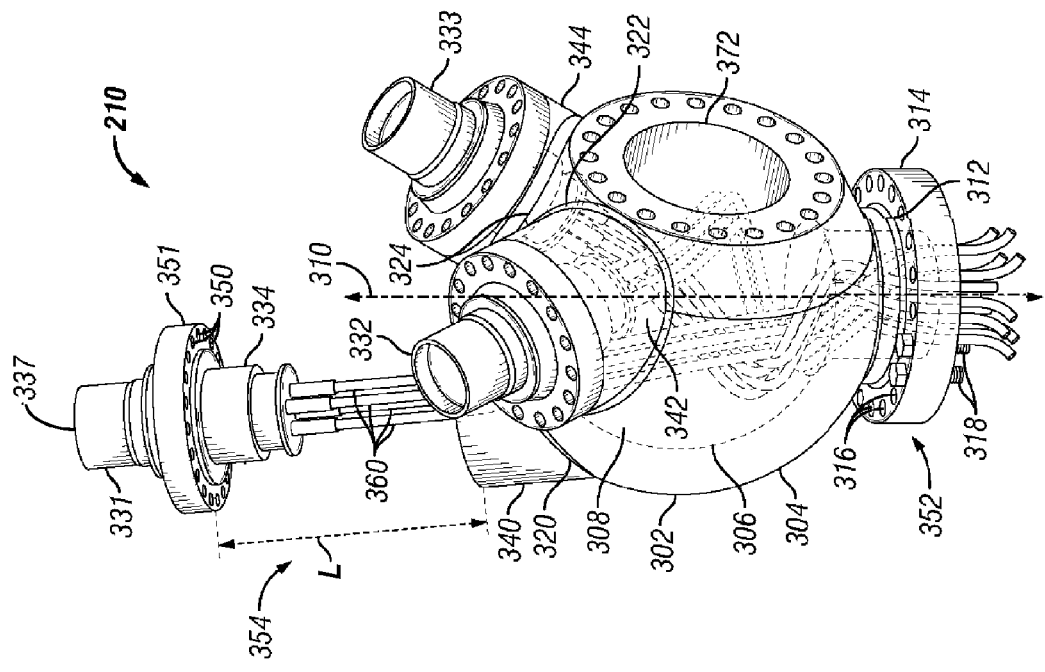
FIG. 2C illustrates an isometric view of the terminal assembly of FIG. 2A including an exemplary penetrator decoupled from the terminal assembly, according to one or more embodiments disclosed.
Figure 2B:
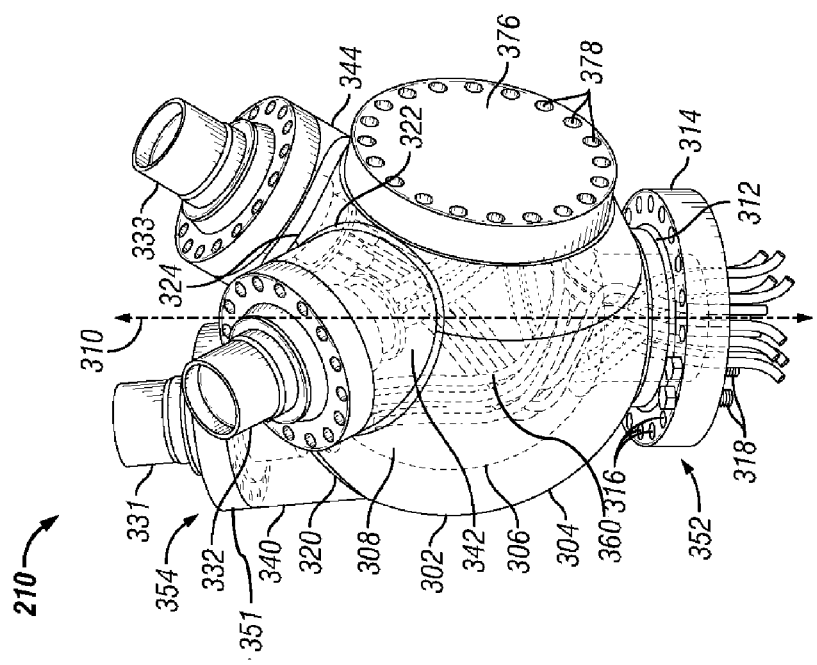
FIG. 2B illustrate an isometric view of the terminal assembly of FIG. 2A, according to one or more embodiments disclosed.

FIGS. 2B and 2C illustrate an isometric view of the exemplary terminal assembly 210 of FIG. 2A, according to one or more embodiments. The terminal assembly 210 may include a body 302 having an exterior surface 304 defining a shape thereof. The shape of the body 302 may be substantially spherical, spherical, polyhedral, or ovoid. As shown in FIGS. 2B and 2C, the terminal assembly 210 may include a hollow body 302 including an interior surface 306 defining a cavity 308 therein. The cavity 308 may be substantially spherical, spherical, polyhedral, ovoid, or any other geometric shape capable of being defined within the body 302. The cavity 308 may have the same or substantially the same shape as the body 302. For example, as shown in FIGS. 2B and 2C, the terminal assembly 210 may include a spherical body 302 having a spherical cavity 308 defined therein. The spherical body 302 may be centered about a longitudinal axis 310 of the terminal assembly 210. The longitudinal axis 310 may extend through a lower end or hemisphere 352 and an upper end or hemisphere 354 of the body 302. As used herein, "lower hemisphere" may refer to the lower half of the body 302 and "upper hemisphere" may refer to the upper half of the body 302, whether the body 302 is spherical, substantially spherical, polyhedral, or ovoid.

As shown in FIGS. 2B and 2C, the terminal assembly 210 may further include one or more terminal ports 320, 322, 324 defined by the exterior surface 304 of the body 302 and extending from the exterior surface 304 to the cavity 308 defined therein. In at least one embodiment, one or more high-voltage penetrators 331, 332, 333 may be coupled to the body 302 about each of the terminal ports 320, 322, 324. In another embodiment, as shown in FIGS. 2B and 2C, each of the penetrators 331, 332, 333 may be coupled with conduit members 340, 342, 344 extending from each of the terminal ports 320, 322, 324.

The terminal ports 320, 322, 324 and/or the conduit members 340, 342, 344 extending therefrom may be positioned in or near the upper hemisphere 354 of the body 302. The terminal ports 320, 322, 324 and/or the conduit members 340, 342, 344 may be helically arranged about the body 302. For example, as shown in FIGS. 2B and 2C, the terminal ports 320, 322, 324 and/or the conduit members 340, 342, 344 may be helically arranged about the longitudinal axis 310 of the terminal assembly 210. The helical arrangement of the terminal ports 320, 322, 324 and/or the conduit members 340, 342, 344 may improve nesting of the penetrators 331, 332, 333 coupled therewith. The helical arrangement may allow the terminal ports 320, 322, 324 and/or the conduit members 340, 342, 344 to be positioned about the body 302 such that the distance therebetween may be minimized, thereby minimizing the amount of material interposed between each of the penetrators 331, 332, 333. Minimizing the amount of material interposed between each of the penetrators 331, 332, 333 may minimize the occurrence of induced eddy currents and improve the efficiency of the penetrators 331, 332, 333. For example, the terminal assembly 210 may be fabricated from one or more metallic materials that may promote induced eddy currents and reduce efficiency. Minimizing the amount of the metallic materials interposed between the penetrators 331, 332, 333 may reduce the magnitude of induced eddy currents, thereby minimizing the reduction in efficiency. Reducing the induced eddy currents may also minimize eddy current heating, thereby decreasing an overall operational temperature of the penetrators 331, 332, 333 and minimizing premature failure of the penetrators 331, 332, 333 resulting from high temperature operation.

The penetrators 331, 332, 333 coupled with the body 302 of the terminal assembly 210 about the terminal ports 320, 322, 324 and/or the conduit members 340, 342, 344 may be configured to receive an electrical current from a power source (not shown) and deliver the electrical current to the motor-compressor 200 and/or components thereof. For example, the penetrators 331, 332, 333 may receive an electrical current from a sea- or land-based power source (not shown) and deliver the electrical current through the terminal assembly 210 to the motor 202 of the motor-compressor 200. It may be appreciated that each of the penetrators 331, 332, 333, terminal ports 320, 322, 324, and/or the conduit members 340, 342, 344 disclosed herein may comprise similar components and parts. Consequently, discussions herein regarding a single penetrator 331, terminal port 320, and/or conduit member 340 are equally applicable to the remaining penetrators 332, 333, terminal ports 322, 324, and/or the conduit members 342, 344.

FIG. 2C illustrates an isometric view of the exemplary terminal assembly 210 of FIG. 2A including the penetrator 331 decoupled from the terminal assembly 210, according to one or more embodiments. As shown in FIG. 2C, the penetrator 331 may include a housing end 334, a power source end 337, and an annular collar 351 interposed therebetween. The power source end 337 may be coupled with a power source (not shown) and may be configured to receive an electrical current or power therefrom. The housing end 334 may be coupled with the motor 102 of the motor-compressor 200 and may be configured to deliver the electrical current from the power source to the motor 202, as further discussed below.

The annular collar 351 may be configured to couple the penetrator 331 with terminal assembly 210 about the terminal port 320 and/or with the conduit member 340. For example, as shown in FIG. 2B, the annular collar 351 may couple the penetrator 331 with the conduit member 340. As shown in FIG. 2C, the annular collar 351 may define one or more circumferentially-arrayed perforations 350 extending therethrough. The perforations 350 may be configured to receive one or more mechanical fasteners (not shown) to facilitate the coupling of the penetrator 331 with the conduit member 340. Illustrative mechanical fasteners may include, but are not limited to, a series of bolts, studs, nuts, and/or any other known mechanical fasteners. Coupling the annular collar 351 of the penetrator 331 with the conduit member 340 may provide a fluid tight seal therebetween.

One or more cables 360 may be coupled with the housing end 334 of the penetrator 331 and may extend from the housing end 334 of the penetrator 331 into the cavity 308. The cables 360 may be at least partially stored or contained within the cavity 308 of the terminal assembly 210. In at least one embodiment, illustrated in FIG. 2B, the cables 360 may be at least partially stored in the cavity 308 such that at least a portion or length of the cables 360 are spirally or helically arranged therein. The helical arrangement of the terminal port 320 and/or the conduit member 340 may facilitate the spiral or helical arrangement of the cables 360 within the cavity 308. The helical arrangement of the cables 360 may allow an excess length of the cables 360 to be stored within the cavity 308. The excess length may allow the penetrator 331 to be separated from the terminal assembly 210 without disturbing or disconnecting the cables 360 from the penetrator 331. In at least one embodiment, the excess length of the cables may allow the penetrator 331 to be separated from the terminal assembly 210 a length (L) sufficient to allow access to and/or installation of the cables 360 and/or the penetrator 331. For example, the length (L) that the penetrator 331 may be separated from the terminal assembly 210 may be from a low of about 12.7 cm (5 in.) to a high of about 76.2 cm (30 in.) or greater.

In at least one embodiment, the cables 360 may extend from the cavity 308 and couple with the motor 202 of the motor-compressor 200 to provide power thereto. In another embodiment, the cables 360 may further extend from the cavity 308 and couple with one or more sensors (not shown) of the motor-compressor 200, the terminal assembly 210, and/or components thereof. Illustrative sensors may include, but are not limited to, motor-based sensors, pressure sensors, temperature sensors, or any combination thereof.

As shown in FIG. 2C, the terminal assembly 210 may further include an access port 372 defined by the body 302. The access port 372 may extend from the exterior surface 304 of the body 302 to the cavity 308 defined therein, thereby providing access to the cavity 308 and the cables 360 stored therein. The access port 372 may be any size and/or shape suitable to allow maintenance of the cables 360 stored in the cavity 308. In at least one embodiment, illustrated in FIG. 2C, the access port 372 may be circular or substantially circular.

As shown in FIG. 2B, the terminal assembly 210 may further include a cover 376 configured to seal the access port 372. The cover 376 may be detachably coupled to the body 302 about the access port 372 to provide a fluid tight seal therebetween. As illustrated in FIG. 2B, the cover 376 may be cylindrical to sufficiently seal the circular access port 372. As shown in FIG. 2B, the cover 376 may define one or more circumferentially-arrayed perforations 378 extending therethrough. The perforations 378 may be configured to receive one or more mechanical fasteners (not shown) to facilitate the coupling of the cover 376 to the body 302. Illustrative mechanical fasteners may include, but are not limited to, a series of bolts, studs, nuts, and/or any other known mechanical fasteners.

As shown in FIGS. 2B and 2C, the terminal assembly 210 may further include a mounting port 312 defined by the exterior surface 304 of the body 302. The mounting port 312 may extend from the exterior surface 304 of the body 302 to the cavity 308 to provide communication therethrough. In at least one embodiment, the mounting port 312 may be positioned in the lower hemisphere 352 of the body 302 such that the mounting port 312 is centered about the longitudinal axis 310 of the terminal assembly 210. The size and shape of the mounting port 312 may be determined, at least in part, by the size and shape of the aperture 218 defined by the housing 212 of the motor-compressor 200. For example, as illustrated in FIGS. 2B and 2C, with continued reference to FIG. 2A, the mounting port 312 may be circular to correspond with the circular aperture 218 of the motor-compressor 200.

The terminal assembly 210 may further include a mounting flange 314 extending from the mounting port 312 to detachably couple the terminal assembly 210 to the housing 212 of the motor-compressor 200. As illustrated in FIGS. 2B and 2C, the mounting flange 314 may define one or more circumferentially-arrayed perforations 316 extending therethrough. The perforations 316 may be configured to receive one or more mechanical fasteners, illustrated as bolts 318 in FIGS. 2B and 2C, to facilitate the coupling of the terminal assembly 210 to the housing. In addition to, or in substitution of the bolts 318, the mechanical fasteners may include one or more studs, nuts, and/or any other known mechanical fasteners.

Having the terminal assembly 210 detachably coupled to the housing 212 may allow the terminal assembly 210 and the housing 212 to be cast or fabricated from different materials. For example, the terminal assembly 210 may be cast with a non-magnetic metal to reduce induced eddy currents and the housing 212 may be cast with a cost effective metallic material such as carbon steel, thereby reducing the overall cost of fabricating and manufacturing the motor-compressor 200. Illustrative materials from which the terminal assembly 210 and/or components thereof may be fabricated may include, but are not limited to, INCONEL®, titanium, a titanium alloy, materials with similar operational properties to titanium, non-magnetic stainless steel, preferably of the 200 or 400 series, or any combination thereof. INCONEL® may include a nickel chromium alloy having oxidation and corrosion resistance.

The motor-compressor 200 including the terminal assembly 210 described herein may be used for subsea applications at substantial sea depths (e.g., about 200-3000 meters). As such, it may be appreciated that the external pressures (e.g., hydrostatic ambient pressures) at such depths may be elevated with respect to topside or terrestrial (e.g., ground based) applications. Accordingly, the terminal assembly 210 described herein may be configured to withstand such elevated pressures. For example, in addition to reducing induced eddy currents, the materials used in fabricating the terminal assembly 210 and/or components thereof may provide a pressure-resistance thereto. The terminal assembly 210 and/or components thereof may be fabricated with a material configured to withstand pressures from a low of about 0.5 MPa to a high of about 35 MPa or greater.

Figure 3:
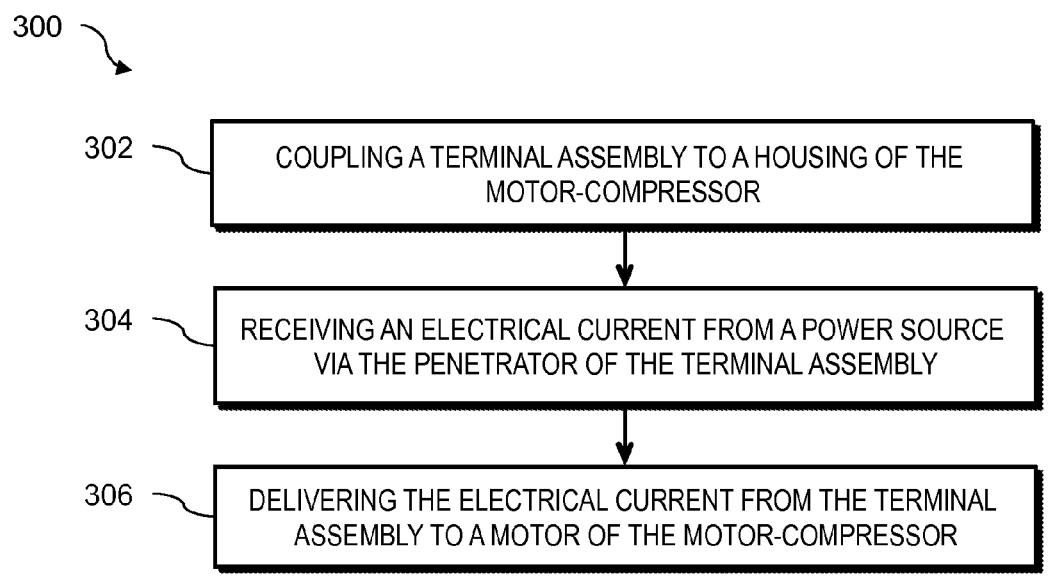
FIG. 3 is a flowchart illustrating a method for operating a subsea motor-compressor, according to one or more embodiments disclosed.

FIG. 3 is a flowchart illustrating a method 300 for operating a subsea motor-compressor, according to one or more embodiments. The method 300 may include coupling a terminal assembly to a housing of the motor-compressor, as shown at 302. The terminal assembly may include a plurality of terminal ports extending through a hollow spherical body to a cavity defined therein, a penetrator detachably coupled with the hollow spherical body about each of the plurality of terminal ports, and a mounting port extending through the hollow spherical body to the cavity disposed therein, where the mounting port may be configured to couple the terminal assembly with the housing of the motor-compressor. The method 300 may also include receiving an electrical current from a power source via the penetrator of the terminal assembly, as shown at 304. The method 300 may further include delivering the electrical current from the terminal assembly to a motor of the motor-compressor, as shown at 306.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A terminal assembly for a subsea motor-compressor, comprising:
    a plurality of terminal ports extending through a hollow spherical body to a cavity defined therein;
    a penetrator detachably coupled with the spherical body about each of the plurality of terminal ports;
    a mounting port extending through the spherical body to the cavity defined therein, the mounting port configured to couple with a housing of the motor-compressor; and
    a mounting flange extending from the mounting port including one or more perforations extending therethrough, the perforations configured to receive a bolt to couple the mounting flange with the housing of the motor-compressor.

2. The terminal assembly of claim 1, wherein the plurality of terminal ports are helically arranged about a longitudinal axis of the spherical body.

3. The terminal assembly of claim 1, further comprising an access port defined by the spherical body and extending therethrough to the cavity defined therein.

4. The terminal assembly of claim 3, further comprising a cover detachably coupled with the spherical body about the access port and configured to provide a fluid tight seal therebetween.

5. The terminal assembly of claim 1, wherein the body is made from a material selected from the group consisting of nickel chromium alloys, titanium, titanium alloys, non-magnetic stainless steel, and combination thereof.

6. The terminal assembly of claim 1, further comprising one or more cables coupled with and extending from the penetrator, at least a portion of the cables helically arranged within the cavity.

7. A terminal assembly for a subsea motor-compressor, comprising:
- a plurality of terminal ports extending through a hollow body to a cavity defined therein, the plurality of terminal ports helically arranged about a longitudinal axis of the hollow body;
- a penetrator detachably coupled with the hollow body about each of the plurality of terminal ports;
- a mounting port extending through the hollow body to the cavity defined therein, the mounting port configured to couple the terminal assembly with a housing of the motor-compressor; and
- a mounting flange extending from the mounting port and defining one or more perforations extending therethrough, the perforations configured to receive a bolt to couple the mounting flange with the housing of the motor-compressor.

8. The terminal assembly of claim 7, wherein the hollow body is spherical.

9. The terminal assembly of claim 7, wherein the plurality of terminal ports are defined about an upper hemisphere of the hollow body and the mounting port is defined about a lower hemisphere of the hollow body.

10. The terminal assembly of claim 7, further comprising an access port defined by the hollow body and extending therethrough to the cavity defined therein.

11. The terminal assembly of claim 10, further comprising a cover detachably coupled with the hollow body about the access port and configured to provide a fluid tight seal therebetween.

12. The terminal assembly of claim 7, wherein the body is made from a material selected from the group consisting of nickel chromium alloys, titanium, titanium alloys, non-magnetic stainless steel, and combination thereof.

13. The terminal assembly of claim 7, further comprising one or more cables coupled with and extending from the penetrator, at least a portion of the cables helically arranged within the cavity.

14. A method for operating a subsea motor-compressor, comprising:
- coupling a terminal assembly to a housing of the motor-compressor, the terminal assembly comprising:
  - a plurality of terminal ports extending through a hollow spherical body to a cavity defined therein;
  - a penetrator detachably coupled with the hollow spherical body about each of the plurality of terminal ports;
  - a mounting port extending through the hollow spherical body to the cavity defined therein, the mounting port configured to couple the terminal assembly with the housing of the motor-compressor; and
  - mechanically fastening the terminal assembly to the housing via a mounting flange extending from the mounting port, the mounting flange including one or more perforations extending therethrough and configured to receive a bolt via the one or more perforations to couple the mounting flange with the housing of the motor-compressor;
- receiving an electrical current from a power source via the penetrator of the terminal assembly; and
- delivering the electrical current from the terminal assembly to a motor of the motor-compressor.

15. The method of claim 14, further comprising helically arranging the plurality of terminal ports about a longitudinal axis of the spherical body to minimize induced eddy currents.

16. The method of claim 14, further comprising storing and helically arranging at least a portion of one or more cables extending from the penetrator in the cavity of the terminal assembly.

17. The method of claim 14, wherein the body of the terminal assembly is made from a material selected from the group consisting of nickel chromium alloys, titanium, titanium alloys, non-magnetic stainless steel, and combination thereof.

* * * * *